United States Patent
Seidel

(10) Patent No.: US 8,097,676 B2
(45) Date of Patent: Jan. 17, 2012

(54) POLYCARBONATE MOLDING COMPOSITIONS

(75) Inventor: Andreas Seidel, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 296 days.

(21) Appl. No.: 12/358,529

(22) Filed: Jan. 23, 2009

(65) Prior Publication Data

US 2010/0190913 A1    Jul. 29, 2010

(51) Int. Cl.
*C08L 69/00* (2006.01)

(52) U.S. Cl. .......................................... 525/67; 524/508

(58) Field of Classification Search .................... 525/67; 524/508

See application file for complete search history.

(56) References Cited

U.S. PATENT DOCUMENTS

| | | | |
|---|---|---|---|
| 3,130,177 A | 4/1964 | Grabowski | |
| 6,486,241 B2 | 11/2002 | Sawano | |
| 6,613,820 B2 | 9/2003 | Fujiguchi et al. | |
| 2002/0161111 A1 | 10/2002 | Sawano | |
| 2002/0165300 A1 | 11/2002 | Fujiguchi et al. | |
| 2007/0021559 A1* | 1/2007 | Seidel et al. | 525/67 |

FOREIGN PATENT DOCUMENTS

| | | |
|---|---|---|
| JP | 2003138120 A * | 5/2003 |
| WO | 9118052 | 11/1991 |
| WO | WO 9118052 A1 * | 11/1991 |
| WO | 2007009622 | 1/2007 |

OTHER PUBLICATIONS

JP 2003138120 A, May 2003, Machine translation.*

* cited by examiner

*Primary Examiner* — Satya Sastri
(74) *Attorney, Agent, or Firm* — John E. Mrozinski, Jr.; Noland J. Cheung

(57) ABSTRACT

An impact modified thermoplastic molding composition comprising aromatic polycarbonate and/or polyester carbonate and a rubber-modified graft polymer prepared by the bulk, solution or bulk-suspension polymerization process is disclosed. The composition that is characterized by its low content of lithium ions and its content of sodium and/or potassium ions exceeding a minimum level features improved hydrolytic resistance.

28 Claims, No Drawings

POLYCARBONATE MOLDING COMPOSITIONS

FIELD OF THE INVENTION

The invention relates to thermoplastic molding compositions and in particular to impact-modified, hydrolysis-resistant polycarbonate compositions.

BACKGROUND OF THE INVENTION

Thermoplastic molding compositions containing polycarbonates and ABS (acrylonitrile/butadiene/styrene) have been known for a long time. Thus, U.S. Pat. No. 3,130,177 A describes readily processable molding compositions of polycarbonates and graft polymers of monomer mixtures of acrylonitrile and an aromatic vinyl hydrocarbon on polybutadiene.

WO 91/18052 A1 discloses PC/ABS compositions having a high heat stability, which are characterized in that the graft polymers have a sodium ion and potassium ion content of less than 1,500 ppm, preferably less than 800 ppm, and comprise a certain amount of antioxidants. The lithium ion content of the composition or graft polymer is not disclosed.

WO 99/11713 A1 discloses flameproofed PC/ABS compositions having an improved resistance to moisture and at the same time a high level of mechanical properties, which are characterized in that the graft polymers have a content of alkali metals of less than 1 ppm. In particular, the sodium ion and potassium ion content of the graft polymer should be less than 1 ppm. The lithium ion content of the composition or graft polymer is not disclosed.

WO 00/39210 A1 discloses impact-modified flameproofed PC compositions comprising a reinforcing substance which have an improved resistance to moisture and at the same time a high level of mechanical properties, which are characterized in that the styrene resins have a content of alkali metals of less than 1 ppm. In particular, the sodium ion and potassium ion content of the styrene resin should be less than 1 ppm. The lithium ion content of the composition or styrene resin is not disclosed. An object of the invention is to provide PC/ABS molding compositions having an improved stability to hydrolysis for the production of complex moldings.

WO 2007/009622 A1 discloses impact-modified molding compositions with improved hydrolysis resistance containing polycarbonate and ABS, and having a low level of lithium impurities.

SUMMARY OF THE INVENTION

An impact modified thermoplastic molding composition comprising aromatic polycarbonate and/or polyester carbonate and a rubber-modified graft polymer prepared by the bulk, solution or bulk-suspension polymerization process is disclosed. The composition that is characterized by its low content of lithium ions and further exhibits a specified amount of sodium and/or potassium ions, features improved hydrolytic resistance.

DETAILED DESCRIPTION OF THE INVENTION

It has been found that impact-modified polycarbonate compositions having a low content of lithium ions have a significantly better resistance to hydrolysis than comparable compositions having a relatively high content of lithium ions even if the total alkali content is relatively high. In the view of the cited state of the art it is surprising, in particular, that it is even advantageous in terms of the hydrolysis resistance of the composition if the sodium and/or potassium content of the compositions exceeds a certain specified minimum limit.

The present invention therefore provides thermoplastic molding compositions comprising A) aromatic polycarbonate and/or polyester carbonate and B) a rubber-modified graft polymer prepared by the bulk, solution or bulk-suspension polymerization process, the molding composition having a content of lithium that is greater than zero and lesser than or equal to 4 ppm, and the molding compositions having a sodium content of greater than 1.5 ppm, preferably greater than 2 ppm and/or a potassium content of greater than 1.5 ppm, preferably greater than 2 ppm.

Preferably, the thermoplastic molding compositions according to the invention comprise A) 30 to 90 parts by wt., preferably 40 to 75 parts by wt., most preferably 40 to 60 parts by wt., based on the total of A) and B), of aromatic polycarbonate and/or polyester carbonate and B) 10 to 70 parts by wt., preferably 25 to 60 parts by wt., most preferably 40 to 60 parts by wt., based on the total of A) and B), of a rubber-modified graft polymer prepared by the bulk, solution or bulk-suspension polymerization process, and lithium in an amount of 0.2 to 3.6 ppm, particularly preferably 0.3 to 3.2 ppm and most preferably 0.4 to 2.5 ppm, and the sodium in an amount of greater than 1.5 ppm, preferably greater than 2 ppm and/or a potassium in an amount of greater than 1.5 ppm, preferably greater than 2 ppm.

In a preferred embodiment of the present invention the sodium content of the molding compositions is less than 100 ppm, preferably below 50 ppm, in particular preferably below 20 ppm and most preferably below 10 ppm and the potassium content of the molding compositions is less than 100 ppm, preferably below 50 ppm, in particular preferably below 20 ppm and most preferably below 10 ppm.

Component A

Aromatic polycarbonates and/or aromatic polyester carbonates according to component A which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934).

Aromatic polycarbonates are prepared e.g. by reaction of aromatic dihydroxy compounds, preferably diphenols, with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents having functionalities of three of more, for example triphenols or tetraphenols. Preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

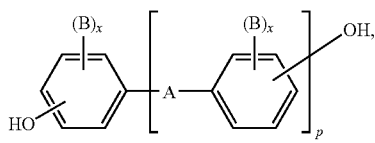
(I)

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms may be fused, or a radical of the formula (II) or (III)

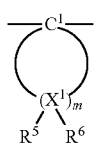
(II)

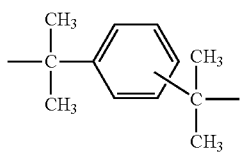
(III)

B in each case is $C_1$ to $C_{12}$-alkyl, preferably methyl, or halogen, preferably chlorine and/or bromine x in each case independently of one another, is 0, 1 or 2, p is 1 or 0, and $R^5$ and $R^6$ independently for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)-diisopropyl-benzenes, and derivatives thereof which are brominated on the nucleus and/or chlorinated on the nucleus.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols may be employed individually or as any desired mixtures. The diphenols are known from the literature or obtainable by known processes.

Chain terminators which are suitable for the preparation of the thermoplastic aromatic polycarbonates are, for example, phenol, p-chlorophenol, p-tert-butylphenol or 2,4,6-tribromophenol, and also long-chain alkylphenols, such as 4-[2-(2,4,4-trimethylpentyl)]-phenol according to DE-A 2 842 005, or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the total moles of the aromatic dihydroxy compounds employed.

The thermoplastic aromatic polycarbonates have weight-average molecular weights ($M_w$ measured e.g. by ultracentrifuge or scattered light measurement) of 10,000 to 200,000 g/mol, preferably 15,000 to 80,000 g/mol, particularly preferably 24,000 to 32,000 g/mol.

The thermoplastic aromatic polycarbonates may be branched in a known manner, and in particular preferably by incorporation of 0.05 to 2.0 mol %, based on the total of the aromatic dihydroxy compounds employed, of compounds having functionalities of three or more, for example those having three and more phenolic groups.

Both homopolycarbonates and copolycarbonates are suitable. For the preparation of copolycarbonates according to the invention according to component A, it is also possible to employ 1 to 25 wt. %, preferably 2.5 to 25 wt. %, based on the total amount of aromatic dihydroxy compounds to be employed, of polydiorgano-siloxanes having hydroxyaryloxy end groups. These are known (U.S. Pat. No. 3,419,634) and may be prepared by processes known from the literature. The preparation of polydiorganosiloxane-containing copolycarbonates is described in DE-A 3 334 782.

Preferred polycarbonates, in addition to the bisphenol A homopolycarbonates, are the copolycarbonates of bisphenol A with up to 15 mol %, based on the total moles of aromatic dihydroxy compounds, of other aromatic dihydroxy compounds mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are, preferably, the diacid dichlorides of isophthalic acid, terephthalic acid, diphenyl ether-4,4'-dicarboxylic acid and naphthalene-2,6-dicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester carbonates.

Suitable chain terminators for the preparation of the aromatic polyester carbonates are, in addition to the monophenols already mentioned, also chlorocarbonic acid esters thereof and the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides.

The amount of chain terminators is in each case 0.1 to 10 mol %, based on the moles of aromatic dihydroxy compounds in the case of the phenolic chain terminators and on the moles of dicarboxylic acid dichloride in the case of monocarboxylic acid chloride chain terminators.

The aromatic polyester carbonates may also contain incorporated aromatic hydroxycarboxylic acids.

The aromatic polyester carbonates may be either linear or branched in a known manner (in this context, see DE-A 2 940 024 and DE-A 3 007 934).

Branching agents which may be used are, for example, carboxylic acid chlorides having functionalities of three or more, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed), or phenols having functionalities of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, or 1,4-bis-[4,4'-dihydroxytriphenyl)-methyl]-benzene, in amounts of 0.01 to 1.0 mol %, based on the aromatic dihydroxy compounds employed. Phenolic branching agents may be initially introduced into the reaction mixture with the aromatic dihydroxy compounds, and acid chloride branching agents may be introduced together with the acid dichlorides.

The content of carbonate structural units in the thermoplastic aromatic polyester carbonates may be varied as desired. Preferably, the content of carbonate groups is a positive amount up to 100 mol %, in particular up to 80 mol %, particularly preferably up to 50 mol %, based on the total of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.).

The thermoplastic aromatic polycarbonates and polyester carbonates may be employed by themselves or in any desired mixture.

Component B

The rubber-modified graft polymer B comprises a random copolymer of

B.1 50 to 97 wt. %, preferably 65 to 95 wt. %, particularly preferably 80 to 90 wt. %, based on B), of one or more vinyl monomers on B.2 3 to 50 wt. %, preferably 5 to 35 wt. %, particularly preferably 10 to 20 wt. %, based on B), of one or more graft bases having a glass transition temperature of <10° C., preferably <–10° C., particularly preferably <–30° C., in particular <–50° C.

the preparation of B) being carried out in a known manner by a bulk or solution or bulk-suspension polymerization process, as described e.g. in U.S. Pat. No. 3,243,481, U.S. Pat. No. 3,509,237, U.S. Pat. No. 3,660,535, U.S. Pat. No. 4,221,833 and U.S. Pat. No. 4,239,863 (incorporated herein by reference).

Monomers B.1 are preferably mixtures of

B.1.1 50 to 99 wt. %, preferably 65 to 85 wt. %, based on B.1, of at least one monomer selected from the group consisting of vinylaromatics and vinylaromatics substituted on the nucleus (such as, for example, styrene, α-methylstyrene, p-methylstyrene or p-chlorostyrene) and B.1.2 1 to 50 wt. %, preferably 15 to 35 wt. %, based on B.1, of at least one monomer selected from the group consisting of vinyl cyanides (unsaturated nitriles, such as acrylonitrile and methacrylonitrile), (meth)acrylic acid ($C_1$-$C_8$)-alkyl esters (such as methyl methacrylate, n-butyl acrylate and tert-butyl acrylate) and derivatives of unsaturated carboxylic acids (such as anhydrides and imides, for example maleic anhydride and N-phenyl-maleimide).

Preferred monomer B.1.1 is selected from the group consisting of styrene and α-methylstyrene, and preferred monomer B.1.2 is selected from the group consisting of acrylonitrile, butyl acrylate, tert-butyl acrylate, maleic anhydride and methyl methacrylate.

Particularly preferred B.1.1 is styrene and the preferred B.1.2 is acrylonitrile. In an alternative embodiment, styrene is employed as monomer B.1.1) and a mixture of at least 70 wt. %, in particular greater than 80 wt. %, particularly preferably greater than 85 wt. %, based on B. 1.2), of acrylonitrile and a maximum of 30 wt. %, in particular max. 20 wt. %, particularly preferably max. 15 wt. %, based on B.1.2), of a further monomer selected from the group consisting of butyl acrylate, tert-butyl acrylate, maleic anhydride and methyl methacrylate may be employed as monomer B.1.2).

Rubbers B.2 which are suitable for the rubber-modified graft polymers B are, for example, diene rubbers, styrene/butadiene (SBR) rubbers, EP(D)M rubbers, that is to say those based on ethylene/propylene and optionally diene, and acrylate, polyurethane, silicone, chloroprene and ethylene/vinyl acetate rubbers and mixtures of the abovementioned rubber types.

Preferred rubbers B.2 are diene rubbers (e.g. based on butadiene, isoprene etc.) or mixtures of diene rubbers or copolymers of diene rubbers or mixtures thereof with further copolymerizable monomers (e.g. according to B.1.1 and B.1.2), with the proviso that the glass transition temperature of component B.2 is below 10° C., preferably below –10° C.

Preferably, the graft base B.2 is a linear or branched diene rubber. Particularly preferably, the graft base B.2) is a linear or branched polybutadiene rubber, a polybutadiene/styrene rubber or a mixture thereof.

If necessary and if the rubber properties of component B.2 are not thereby impaired, component B may additionally also comprise small amounts, typically less than 5 wt. %, preferably less than 2 wt. %, based on B.2, of ethylenically unsaturated crosslinking monomers. Examples of such monomers include alkylene diol di-(meth)-acrylates, polyester di-(meth)-acrylates, divinylbenzene, trivinylbenzene, triallyl cyanurate, allyl(meth)-acrylate, diallyl maleate and diallyl fumarate.

The rubber-modified graft polymer B may be obtained by grafting polymerization of B.1 on to B.2, the grafting polymerization being carried out by a bulk or solution or bulk-suspension polymerization process.

In the preparation of the rubber-modified graft polymers B, it is essential that the rubber component B.2 is present in dissolved form in the mixture of monomers B.1.1 and/or B.1.2 before the grafting polymerization. A further organic solvent may optionally also be added for this purpose, such as, for example, methyl ethyl ketone, toluene or ethylbenzene or a mixture of conventional organic solvents. The rubber component B.2 may thus be neither so highly crosslinked that a solution in B.1.1 and/or B.1.2, optionally in the presence of further solvents, becomes impossible, nor may B.2 already be in the form of discrete particles at the start of the grafting polymerization. The particle morphology and increasing crosslinking of B.2, which are important for the product properties of B, develop only in the course of the grafting polymerization (in this context see, for example, Ullmann, Encyclopädie der technischen Chemie, volume 19, p. 284 et seq., 4th edition 1980 incorporated herein by reference). Further additives, such as polymerization initiators, stabilizers, regulators, crosslinking agents and additives which inhibit postcrosslinking, in particular also oils (for example silicone oils, synthetic machine oils or plant oils) may be added to the reaction mixture in the grafting polymerization reaction.

The copolymer of B.1.1 and B.1.2 is conventionally present in the polymer B in part in a form grafted on to or into the rubber B.2, this graft copolymer forming discrete particles in the polymer B. The content of the grafted-on or—in copolymer of B.1.1 and B.1.2 in the total copolymer of B.1.1 and B.1.2—that is to say the grafting yield (=weight ratio of the graft monomers actually grafted to the total graft monomers used×100, stated in %)–is preferably 2 to 40% more preferably 3 to 30%, particularly preferably 4 to 20%.

The average particle diameter of the resulting grafted rubber particles (determined by counting on electron microscopy photographs) is in the range from 0.3 to 5 µm, preferably 0.4 to 2.5 µm, in particular 0.5 to 1.5 µm.

Preferably, the rubber-modified graft polymer B has a content of lithium of more than zero and less than or equal to 10 ppm, particularly preferably 0.5 ppm to 9 ppm, preferably 0.8 ppm to 8 ppm.

The composition may comprise further additives. For example, polymeric constituents and functional additives may be added to the composition.

In particular, (co)polymers of at least one monomer selected from the group consisting of vinylaromatics, vinyl cyanides (unsaturated nitriles), (meth)acrylic acid ($C_1$ to $C_8$)-alkyl esters, unsaturated carboxylic acids and derivatives (such as anhydrides and imides) of unsaturated carboxylic acids may be added as component C.

Copolymers C) which are suitable in particular are resinous, thermoplastic and rubber-free and are of C.1 50 to 99 wt. %, preferably 65 to 90 wt. %, based on the (co)polymer C), of at least one monomer chosen from the group consisting of vinylaromatics (such as, for example, styrene and α-methylstyrene), vinylaromatics substituted on the nucleus (such as, for example p-methylstyrene or p-chlorostyrene) and (meth)acrylic acid ($C_1$-$C_8$)-alkyl esters (such as, for example, methyl methacrylate, n-butyl acrylate and tert-butyl acrylate) and C.2 1 to 50 wt. %, preferably 10 to 35 wt. %, based on the (co)polymer C), of at least one monomer chosen from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate and tert-butyl acrylate), unsaturated carboxylic acids and derivatives of unsaturated carboxylic acids (for example maleic anhydride and N-phenyl-maleimide).

The copolymer of C.1 styrene and C.2 acrylonitrile is particularly preferred. Also suitable as component C) is a homopolymer of (meth)acrylic acid ($C_1$-$C_8$)-alkyl ester (such as methyl methacrylate, n-butyl acrylate and tert-butyl acrylate)

Such (co)polymers C) are known and may be prepared by free-radical polymerization, in particular by emulsion, suspension, solution or bulk polymerization. The (co)polymers C) preferably have molecular weights $M_w$ (weight-average, determined by light scattering or sedimentation) of between 15,000 and 200,000.

Rubber-modified copolymers prepared by the emulsion polymerization process (component D) may also be employed as further polymeric additives. These commercially available graft polymers, which are as a rule supplied as impact modifiers, are preferably acrylonitrile/styrene/butadiene (ABS) and/or methyl methacrylate/styrene/butadiene (MBS). However, graft polymers D) which are likewise preferably suitable are those of D.1 5 to 95 wt. %, based on component D), of a grafted shell of D.1.1 50 to 99 wt. %, preferably 65 to 90 wt. %, based on the grafted shell D.1, of at least one monomer chosen from the group consisting of vinylaromatics (such as, for example, styrene and α-methylstyrene), vinylaromatics substituted on the nucleus (such as, for example p-methylstyrene or p-chlorostyrene) and (meth)acrylic acid ($C_1$-$C_8$)-alkyl esters (such as, for example, methyl methacrylate, n-butyl acrylate and tert-butyl acrylate) and D.1.2 1 to 50 wt. %, preferably 10 to 35 wt. %, based on the grafted shell, of at least one monomer chosen from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate and tert-butyl acrylate), unsaturated carboxylic acids and derivatives of unsaturated carboxylic acids (for example majeic anhydride and N-phenyl-maleimide).

on

D.2 a graft base chosen from the group consisting of diene rubbers, silicone rubbers, acrylate rubbers and silicone/acrylate composite rubbers.

In a preferred embodiment the Rubber-modified copolymers prepared by the emulsion polymerization process exhibit core-shell structure.

The composition may moreover comprise further conventional polymer additives (component E), such as flameproofing agents, antidripping agents (for example fluorinated polyolefins, silicones and aramid fibres), lubricants and mold release agents, for example pentaerythritol tetrastearate, nucleating agents, antistatics, stabilizers, fillers and reinforcing substances (for example glass or carbon fibres, mica, kaolin, talc, $CaCO_3$ and glass flakes) as well as dyestuffs and pigments.

Preferably compositions do not contain flameproofing agents selected from the group of organic esters of phosphoric acid, particular preferably the composition is free of flameproofing agents.

Preparation of the Molding Compositions and Molded Articles

The thermoplastic molding compositions according to the invention are prepared by mixing the particular constituents in a known manner and subjecting the mixture to melt compounding and melt extrusion at temperatures of 200° C. to 300° C. in conventional units, such as internal kneaders, extruders and twin-screw extruders.

The mixing of the individual constituents may take place in a known manner, either successively or simultaneously, and in particular either at about 20° C. (room temperature) or at a higher temperature.

The molding compositions according to the invention may be used for the production of all types of shaped articles. These may be produced by injection molding, extrusion and blow molding processes. A further form of processing is the production of shaped articles by thermoforming from previously produced sheets or films.

Examples of such shaped articles are films, profiles, all types of housing components, e.g. for domestic appliances, such as juice presses, coffee machines and mixers; for office machines, such as monitors, flatscreens, notebooks, printers and copiers; sheets, pipes, electrical installation conduits, windows, doors and further profiles for the building sector (interior finishing and exterior uses) as well as electrical and electronic components, such as switches, plugs and plug sockets and components for commercial vehicles, in particular for the automobile sector.

In particular, the molding compositions according to the invention may also be used, for example, for the production of the following shaped articles or moldings: interior finishing components for rail vehicles, ships, aircraft, buses and other motor vehicles, housings for electrical equipment containing small transformers, housings for equipment of processing and transmitting information, housings and coverings for medical equipment, massage equipment and housings therefor, toy vehicles for children, flat wall elements, housings for safety devices, thermally insulated transportation containers, moldings for sanitary and bath fittings, covering gratings for ventilation openings and housings for garden equipment.

EXAMPLES

Component A

Linear polycarbonate based on bisphenol A having a weight-average molecular weight $\overline{M}_w$ of 28 kg/mol (determined by GPC).

Components B-1 to B-7

ABS polymers prepared by bulk polymerization with an A:B:S ratio of 20:15:65. The various ABS polymers B-1 to B-7 differ only with respect to the amounts of impurities of lithium, sodium and potassium, which they contain.

Preparation and testing of the molding compositions according to the invention

Components A and B are mixed on a 1.31 internal kneader.

To evaluate the resistance to hydrolysis of the exemplified PC/ABS compositions, the melt volume flow rates (MVR) were determined in accordance with ISO1133 at 260° C. with a 5 kg piston load on samples immediately after the compounding and after hydrolytic ageing at 95° C. and 100% relative humidity for 7 days. The resulting change in the MVR is a measure of the resistance of the composition to hydrolysis, and is calculated as follows:

$$MVR \text{ change} = \frac{MVR \text{ (after storage)} - MVR \text{ (before storage)}}{MVR \text{ (before storage)}} * 100\%.$$

Alkali and alkali earth metal contents of the compositions have been determined by inductive coupled plasma atomic emission spectroscopy (ICP-AES).

TABLE 1

Molding Compositions and Properties

| | V1 | 2 | 3 | V4 | 5 | 6 | V7 |
|---|---|---|---|---|---|---|---|
| Polycarbonate | 50 | 50 | 50 | 50 | 50 | 50 | 50 |
| B-1 | 50 | | | | | | |
| B-2 | | 50 | | | | | |
| B-3 | | | 50 | | | | |
| B-4 | | | | 50 | | | |
| B-5 | | | | | 50 | | |
| B-6 | | | | | | 50 | |
| B-7 | | | | | | | 50 |
| MVR (before hydrolysis) [ml/10 min] | 21.5 | 16.2 | 15.6 | 21.2 | 15.7 | 14.9 | 13.6 |
| MVR (after hydrolysis) [ml/10 min] | 24.2 | 16.3 | 15.9 | 28.3 | 16.6 | 15.8 | 15.1 |
| MVR change [%] | 13 | 1 | 2 | 33 | 6 | 6 | 11 |
| Li content of composition [ppm] | 3.6 | 1.9 | 1.9 | 6.1 | 1.9 | 1.9 | 1.9 |
| Na content of composition [ppm] | 1.2 | 2.9 | 1.2 | 1.2 | 5.5 | 1.2 | 1.2 |
| K content of composition [ppm] | 1.2 | 1.2 | 2.75 | 1.2 | 1.2 | 5.25 | 1.2 |
| Ca content of composition [ppm] | 2.9 | 2.9 | 2.9 | 2.9 | 2.9 | 2.9 | 2.9 |
| Mg content of composition [ppm] | <1 | <1 | <1 | <1 | <1 | <1 | <1 |
| Ba content of composition [ppm] | <1 | <1 | <1 | <1 | <1 | <1 | <1 |

The data points to that (i) The hydrolysis resistance of the compositions is impaired if the lithium ion content increases beyond 4 ppm (compare compositions 1, V4 and V7).

(ii) For compositions with lithium ion contents of below 4 ppm, hydrolysis resistance is further improved if sodium content and/or potassium content is increased beyond 1.5 ppm (compare compositions 2, 5 and V7 as well as compositions 3, 6 and V7).

(iii) Thus optimum hydrolysis resistance is surprisingly realized in compositions exhibiting lithium ion content below 4 ppm and simultaneously exhibiting sodium and/or potassium ion content of greater than 1.5 ppm.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed:

1. A thermoplastic molding composition comprising
A) aromatic polycarbonate and/or polyester carbonate and
B) a rubber-modified graft polymer prepared by the bulk, solution or bulk-suspension polymerization process,
the molding composition having a positive content of lithium ions of less than or equal to 3.2 ppm, and the molding compositions having a sodium content of greater than 1.5 ppm, and/or a potassium content of greater than 1.5 ppm.

2. The composition according to claim 1 free of flame-proofing agents selected from the group of organic esters of phosphoric acid.

3. The composition according to claim 1 having a sodium content and/or a potassium content of greater than 2.0 ppm.

4. The composition according to claim 1 wherein
A) is present at an amount of 30 to 90 parts and
B) is present at an amount of 10 to 70 parts said parts, both occurrences, relative to the total weight of A) and B).

5. The composition of claim 1 wherein said B) comprise
B.1) 50 to 97 wt. %, based on B), of the polymerization product of at least one vinyl monomer grafted on
B.2) 3 to 50 wt. %, based on B), of one or more graft bases having a glass transition temperature of <10 ° C.

6. The composition according to claim 1 wherein content of lithium is 0.3 ppm to 3.2 ppm.

7. The composition according to claim 1 wherein said
A) is present at an amount of 40 to 60 parts and said
B) is present at an amount of 60 to 40 parts, the parts, both occurrences, being relative to the total weight of A) and B).

8. The composition according to claim 1 wherein aromatic polycarbonate has a weight-average molecular weight of 24,000 to 32,000 g/mol.

9. The composition according to claim 1 wherein the rubber-modified graft polymer comprise
- B.1 65 to 95 wt. %, based on B), of the polymerized product of a mixture of
  - B.1.1 50 to 99 wt. %, based on B.1), of at least one member selected from the group consisting of vinylaromatics and vinylaromatics substituted on the nucleus and
  - B.1.2 1 to 50 wt. %, based on B.1), of at least one member selected from the group consisting of vinyl cyanides, (meth)acrylic acid (C1-C8)-alkyl esters and derivatives of unsaturated carboxylic acids grafted on
- B.2 5 to 35 wt. %, based on B), of one or more graft bases having a glass transition temperature of <−10 ° C.

10. The composition according to claim 9, wherein B.1.1) is styrene and B.1.2) is acrylonitrile.

11. The composition according to claim 9, wherein B.1.1) is styrene and B.1.2) is a mixture of at least 70 wt. %, based on B.1.2), of acrylonitrile and not more than 30 wt. %, based on B.1.2) of at least one member selected from the group consisting of butyl acrylate, tert-butyl acrylate, maleic anhydride and methyl methacrylate.

12. The composition according to claim 9, wherein B.2) is a diene rubber.

13. The composition according to claim 12, wherein B.2) is at least one member selected from the group consisting of polybutadiene rubber, and polybutadiene/styrene rubber.

14. The composition according to claim 1 wherein the rubber-modified graft polymer has a content of lithium of 0.8 ppm to 8 ppm.

15. The composition according to claim 1 further comprising a (co)polymer of
- C.1 50 to 99 wt. %, based on the (co)polymer, of at least one monomer selected from the group consisting of vinylaromatics, vinylaromatics substituted on the nucleus and (meth)acrylic acid (C1-C8)-alkyl esters and
- C.2 1 to 50 wt. %, based on the copolymer, of at least one monomer selected from the group consisting of vinyl cyanides, (meth)acrylic acid (C1-C8)-alkyl esters, unsaturated carboxylic acids and derivatives of unsaturated carboxylic acids.

16. The composition according to claim 1 further comprising a graft polymer D prepared by emulsion polymerization.

17. The composition according to claim 16, wherein D) comprises
- D.1 5 to 95 wt. %, based on D), of a copolymerized grafted shell of
  - D.1.1 50 to 99 wt. %, based on the grafted shell D.1, of at least one member selected from the group consisting of vinylaromatics, vinylaromatics substituted on the nucleus and (meth)acrylic acid (C1-C8)-alkyl esters and
  - D.1.2 1 to 50 wt. %, based on the grafted shell, of at least one member selected from the group consisting of vinyl cyanides, (meth)acrylic acid (C1-C8)-alkyl esters, unsaturated carboxylic acids and derivatives of unsaturated carboxylic acids grafted on
- D.2 a graft base selected from the group consisting of diene rubbers, silicone rubbers, acrylate rubbers and silicone/acrylate composite rubbers.

18. The composition according to claim 17, wherein D.1.1 is styrene, D.1.2 is acrylonitrile or methyl methacrylate and D.2 is butadiene rubber.

19. The composition according to claim 1 further comprising at least one member selected from the group consisting of flameproofing agents, antidripping agents, lubricants mold release agents, nucleating agents, antistatics, stabilizers, fillers, reinforcing agents, dyestuffs and pigments.

20. A molded article comprising the composition of claim 1.

21. The composition according to claim 1 wherein the composition has a sodium content of greater than 1.5 ppm and less than 100 ppm.

22. The composition according to claim 1 wherein the composition has a sodium content of greater than 1.5 ppm and less than 50 ppm.

23. The composition according to claim 1 wherein the composition has a sodium content of greater than 1.5 ppm and less than 20 ppm.

24. The composition according to claim 1 wherein the composition has a sodium content of greater than 1.5 ppm and less than 10 ppm.

25. The composition according to claim 1 wherein the composition has a potassium content of greater than 1.5 ppm and less than 100 ppm.

26. The composition according to claim 1 wherein the composition has a potassium content of greater than 1.5 ppm and less than 50 ppm.

27. The composition according to claim 1 wherein the composition has a potassium content of greater than 1.5 ppm and less than 20 ppm.

28. The composition according to claim 1 wherein the composition has a potassium content of greater than 1.5 ppm and less than 10 ppm.

* * * * *